Aug. 24, 1965 — R. R. KEESEE — 3,201,910
CONSTRUCTION MOLDING
Filed Aug. 14, 1962 — 2 Sheets-Sheet 1

INVENTOR
ROLAND R. KEESEE
BY Albert J. Kramer
ATTORNEY

Aug. 24, 1965  R. R. KEESEE  3,201,910
CONSTRUCTION MOLDING
Filed Aug. 14, 1962  2 Sheets-Sheet 2
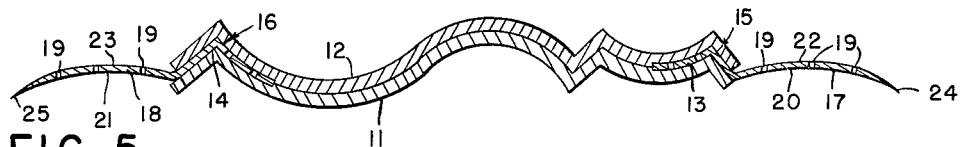
FIG. 5.
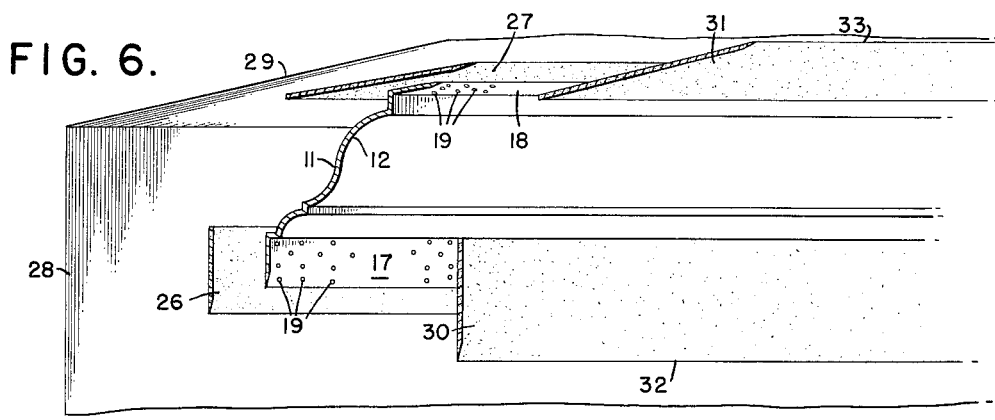
FIG. 6.
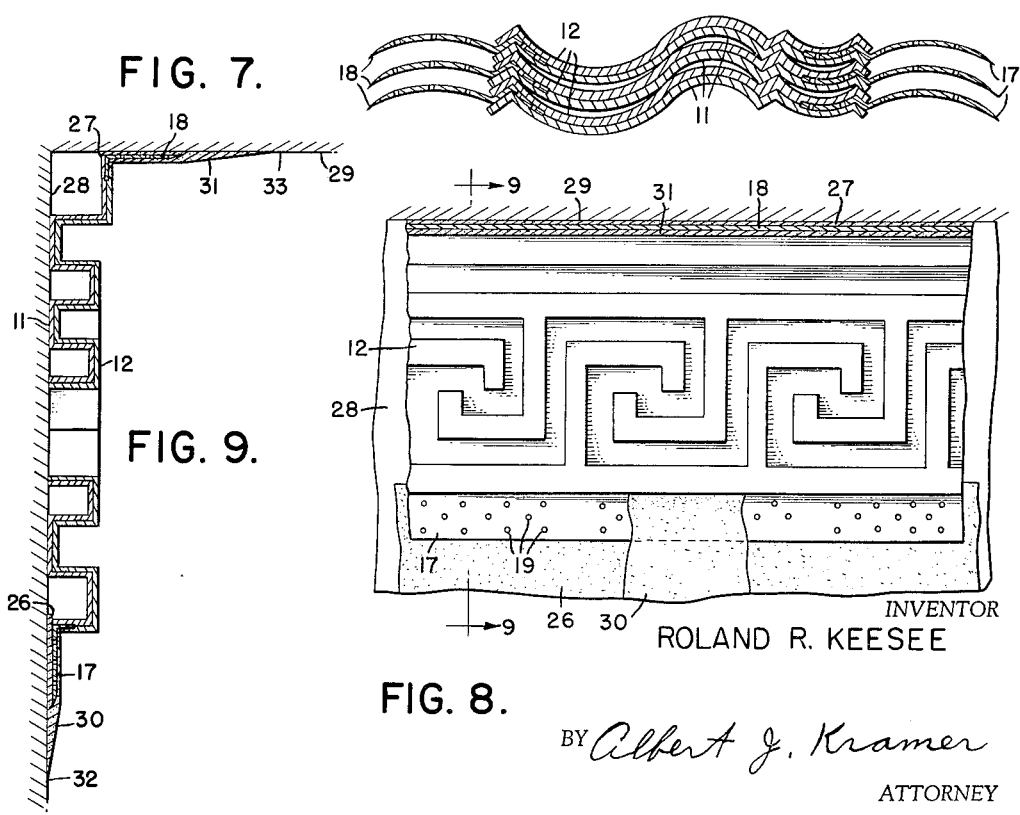
FIG. 7.
FIG. 9.
FIG. 8.
INVENTOR
ROLAND R. KEESEE
BY Albert J. Kramer
ATTORNEY

United States Patent Office 3,201,910
Patented Aug. 24, 1965

3,201,910
CONSTRUCTION MOLDING
Roland R. Keesee, 275 Plainview Circle,
North Little Rock, Ark.
Filed Aug. 14, 1962, Ser. No. 216,879
5 Claims. (Cl. 52—716)

This in a continuation-in-part of my copending application for patent, Serial No. 857,054, filed December 3, 1959, now abandoned.

This invention relates to construction materials and it is more particularly concerned with the provision of articles of manufacture adapted for use in place of the conventional wood molding used in building constructions.

Conventional wood molding is relatively expensive and has certain deficiences included among which is its inability to remain in close contact with building surfaces, such as the ceilings and walls, to which it may be applied. Warping and shrinking are among the reasons for this, and the resultant gaps or cracks between the molding and the building surfaces are unsightly.

Accordingly, the general objects of this invention are the provision of a molding in the place of the conventional wood molding which not only obviates these deficiencies, but which is also less expensive.

Another object of the invention is the provision of a molding of the type mentioned which is easily and quickly applied, which forms a tight joint with the building surfaces to which it is applied and which will not warp or shrink out of contact with these surfaces.

A further object of the invention is the provision of a molding of the type mentioned which includes features that permit it to be fitted at the corners of rooms easily and accurately.

A still further object of the invention is the provision of a molding product which can be applied at corners between a ceiling and adjacent wall, for example, in close contact with the surfaces of both the ceiling and wall, irrespective of the accuracy of the angular relation between the ceiling and wall.

A still further object of the invention is the provision of a molding product which can, before application, be stored and shipped in nested form to occupy a relatively small space compared to the space that would be required to store and transport the ordinary wood molding of equal lineal coverage.

A still further object of the invention is the provision of a molding product comprising a relatively stiff center strip and relatively flexible side flaps extending from the longitudinal edges of the center strip, the longitudinal edges being so shaped relative to the flaps as to improve the appearance of the molding when it is applied.

A still further object of the invention is the provision of a molding product of the type mentioned in which the flaps are so designed as to facilitate their embedment in a building construction.

These and still further objects, advantages and features of the invention will appear from the following description, considered together with the accompanying drawing.

In the drawing:

FIG. 5 is a cross-sectional view of an embodiment of the invention apart from its application to a building structure.

FIG. 6 is a perspective view of a portion of a room between the ceiling and wall showing the same embodiment applied and illustrating the manner of its application thereto.

FIG. 7 is a cross-sectional view of a group of nested strips in accordance with the invention showing how they can fit together to conserve storage space.

FIG. 8 is a fragmentary view of a room showing the disposition thereto of a type of molding in accordance with this invention lying flat against the wall of the room.

FIG. 9 is a cross-sectional view along the line 9—9 of FIG. 8, on a larger scale.

Figures 1, 2, 3, 4:
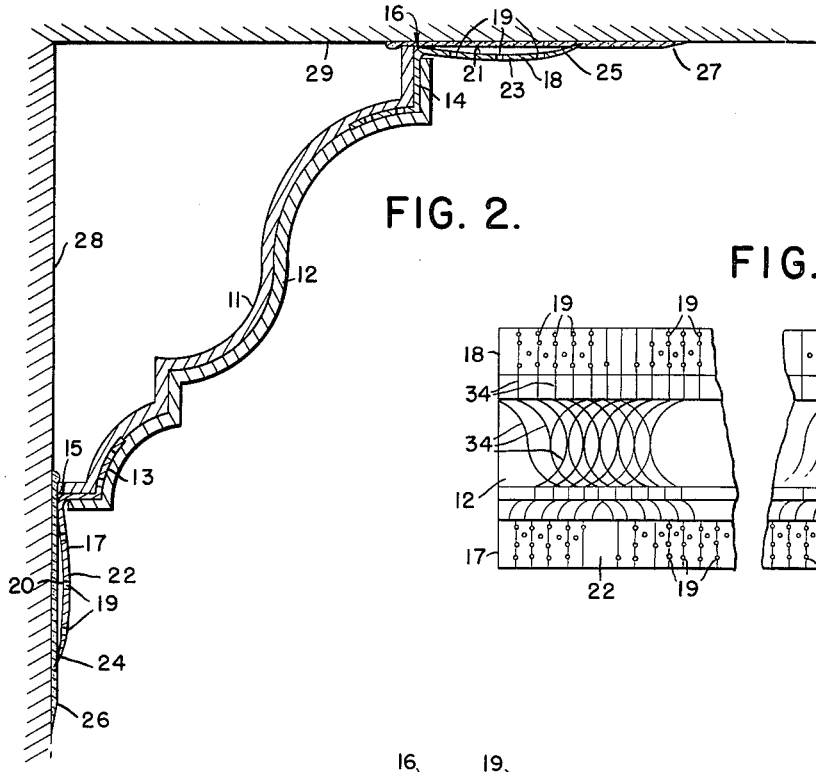
FIG. 1 is a front face view of a strip of molding in accordance with an embodiment of the invention, partly broken away.
FIG. 2 is a cross-sectional view of the embodiment as it would appear applied to the corner between a ceiling and adjacent wall, prior to embedment of the flaps, the ceiling and wall being shown fragmentarily.
FIG. 3 is a view similar to FIG. 2 after embedment of the flaps.
FIG. 4 is a view of a portion of FIG. 3 on a larger scale.

Referring with more particularity to the drawing in which like numerals designate like parts throughout the various views, the embodiment comprises a strip of laminated cardboard or other suitable fibrous sheet material having a rear ply or backing 11 and a front ply or facing 12 glued together and shaped to any decorative design desired. The design illustrated in FIGS. 1 to 7 is generally known in the trade as "crown molding," but any design may be used in which the width along the face is greater than the distance between the longitudinal edges. Marginal longitudinal portions of the strip are, preferably, at right angles to each other to permit placing them at right angles to the corner surfaces of the building, as illustrated, with the edges abutting the surfaces, respectively.

The outer surface of the facing ply 12 is calendered to provide a smooth surface, while the opposite surface and those of the backing ply 11 need not be calendered.

Between the plies 11 and 12 there are disposed on either longitudinal side, marginal edges 13 and 14 of flexible application flaps 15 and 16. These marginal edges 13 and 14 are glued in place to the plies 11 and 12 and the remaining portions 17 and 18 of the flaps extend outwardly from said plies 11 and 12. The flaps 15 and 16 are preferably sheets of paper, as illustrated in the drawing, perforated to provide a multiplicity of apertures 19 for letting air escape from under the flaps and thereby prevent the formation of air blisters. These flaps are also laterally curved to resist deformation before they are set in place. The backsides 20 and 21 are concave and the front sides 22 and 23 are convex which provides the advantage of pointing the tips of the flaps inward toward the cement layer on the building surface when the strips are first applied and thereby facilitate their installation. These flaps also have feathered outer edges 24 and 25. Due to this feathering and the curvature of the flaps these edges become embedded in the cement when an applicator tool, such as a trowel, is pulled firmly over the flap.

The longitudinal edges of the front ply 12 are laterally recessed relative to the longitudinal edges of the rear ply 11. The purpose of these recesses is to add ornamental sharpness to the appearance of the completed installation by permitting a direct abutting engagement of the edges of the strips with the building surfaces. Also, any break caused by the hinge action of the molding or by contraction thereof relative to the building surfaces will occur in a recess and be less noticeable, if at all, than if the recess were not provided.

The molding is attached, as shown in FIGS. 2 and 3, by first applying thin layers of cement 26 and 27 to the wall 28 and adjacent ceiling 29, respectively, where the flap portions 17 and 18 are to be disposed. The cement may be of the conventional water-mixed pastes used in treating the joints and angles of walls formed by ordinary gypsum board. Immediately after the application of the cement, the portions 17 and 18 are overlaid thereon and pressed on the cement with a suitable tool, such as a wide putty knife. After proper drying time has been permitted to elapse, a second application 30 and 31 of the cement is laid onto the first, thereby embedding the perforated portions 17 and 18. The latter applications of the cement are formed in wider swaths and are preferably trowled to thin feather edges 32 and 33 at the outer sides of the swaths.

To facilitate cutting the ends of the molding for correct fitting at corner joints, there is printed or otherwise provided on the surface of the molding two sets of parallel mitre lines 34 and 35, respectively, one set being for one aspect of a corner joint line and the other set being for the corresponding aspect of a consecutive corner joint. The lines of each set are spaced closely together, whereby the required mitre edge can readily be provided by cutting along one of the lines, these lines being useful for both inside and outside corners by simple inversion. Closer tolerances can be obtained, when desired, by interpolating between consecutive lines, using the lines themselves as directional guides.

FIGS. 7 and 8 illustrate a fret type molding design that is being used by disposing it flat against the upper border of the wall. However, the manner of application by means of cement is substantially the same.

Having thus described my invention, I claim:

1. An all paper molding consisting essentially of a strip of relatively thick cardboard material having a permanent decorative shape, said strip comprising a front ply and a rear ply glued together, flaps of relatively thin sheets of paper extending along the longitudinal edges of said strip, marginal portions of the flaps being disposed between and glued to said plies, said front ply being laterally recessed relative to the rear ply along each of its longitudinal edges.

2. An all paper molding consisting essentially of a strip of relatively thick cardboard material having a permanent decorative shape, said strip comprising a front ply and a rear ply glued together, flaps of relatively thin sheets of paper extending along the longitudinal edges of said strip, marginal portions of the flaps being disposed between and glued to said plies, said front ply being laterally recessed relative to the rear ply along each of its longitudinal edges, said flaps having their surfaces smooth and being each shaped to the form of a self supporting arc extending laterally outward and rearward from said longitudinal edges.

3. A decorative inside corner paper molding consisting essentially of a strip of stiff relatively thick self-supporting laminated cardboard having a back ply and a front ply glued together, said cardboard being shaped to provide a definite cross-sectional configuration longer than the straight line distance between the longitudinal edges of the strip, relatively thin flaps of flexible paper sheets extending along the longitudinal edges of the strip, portions of said flaps being straddled by and glued to longitudinal marginal border sections of said plies; said sections being each bent to lie at an angle to the strip portion therebetween and substantially at right angles to each other for disposition edgewise against the surfaces of a building forming an inside angle corner to which the molding is to be applied; the remaining portions of said flaps having their surfaces smooth and being each shaped to the form of a self supporting arc extending outwardly from said sections outwardly and rearwardly from said longitudinal edges.

4. An all paper molding as defined by claim 3 in which the front ply is laterally recessed relative to the rear ply along each of its longitudinal edges.

5. A decorative inside corner paper molding consisting essentially of a strip of stiff relatively thick self-supporting laminated cardboard having a back ply and a front ply glued together, said cardboard being shaped to provide a definite cross-sectional configuration longer than the straight line distance between the longitudinal edges of the strip, relatively thin flaps of flexible paper sheets extending along the longitudinal edges of the strip, portions of said flaps being straddled by and glued to longitudinal marginal border sections of said plies; said sections being each bent to lie at an angle to the strip portion therebetween and substantially at right angles to each other for disposition edgewise against the surfaces of a building forming an inside angle corner to which the molding is to be applied; the remaining portions of said flaps having their surfaces smooth and being each shaped to the form of a self supporting arc extending outwardly from said sections outwardly and rearwardly from said longitudinal edges, said flaps having perforations therein.

References Cited by the Examiner

UNITED STATES PATENTS

| | | | |
|---|---|---|---|
| 159,494 | 2/75 | Brock | 20—74 |
| 311,409 | 1/85 | Butz et al. | 20—74 X |
| 522,369 | 7/94 | Heerwagen | 20—74 X |
| 1,537,758 | 5/25 | Fischer | 50—166 |
| 1,662,287 | 3/28 | Weitz | 50—165 |
| 1,813,173 | 7/31 | Kuehn | 50—165 |
| 1,867,449 | 7/32 | Ecket et al. | 20—9 X |
| 2,234,701 | 3/41 | Lyman | 20—74 X |
| 2,557,660 | 6/51 | Jacobs | 50—202 X |
| 3,086,328 | 3/63 | Peterson et al. | 50—194 X |

HENRY C. SUTHERLAND, *Primary Examiner.*